United States Patent [19]

Dürr et al.

[11] Patent Number: 4,861,265

[45] Date of Patent: Aug. 29, 1989

[54] APPARATUS AND METHOD FOR THE HEAT TREATMENT OF FINE-GRAINED MATERIAL

[75] Inventors: Manfred Dürr, Oelde; Georg Unland, Ennigerloh; Günter Driemeier, Lienen; Karl Krützner, Beckum; Heinz-Herbert Schmits, Rheda-Wiedenbrück; Michael von Seebach, Ennigerloh; Otto Heinemann, Ennigerloh; Wolfgang Rother, Oelde; Dieter Dreyer, Ennigerloh, all of Fed. Rep. of Germany

[73] Assignee: Krupp Polysius AG, Fed. Rep. of Germany

[21] Appl. No.: 257,208

[22] Filed: Oct. 13, 1988

[30] Foreign Application Priority Data

Oct. 30, 1987 [DE] Fed. Rep. of Germany ....... 3736905

[51] Int. Cl.$^4$ .............................................. F27B 7/02
[52] U.S. Cl. .................................. 432/103; 432/106; 432/14
[58] Field of Search ................... 432/105, 106, 58, 14, 432/103

[56] References Cited

U.S. PATENT DOCUMENTS

| 3,881,862 | 5/1975 | Nishida et al. | 432/14 |
| 4,392,822 | 7/1983 | Brachthauser | 432/106 |
| 4,514,170 | 4/1985 | Kupper | 432/106 |
| 4,747,879 | 5/1988 | Wolter et al. | 432/106 |

Primary Examiner—Henry C. Yuen
Attorney, Agent, or Firm—Learman & McCulloch

[57] ABSTRACT

The invention relates to apparatus and to a method for the heat treatment of fine-grained material using a multi-stage cyclone preheater and a combustion chamber supplied with tertiary air from the cooler, in which the branched part of the tertiary air pipe extends upwards and the material discharged from the second-lowest stage of the cyclone preheater is introduced into one branch pipe at a point which lies lower than the point at which this branch pipe is connected to the combustion chamber. In this way good dispersal of the material which is delivered pneumatically to the combusion chamber and excellent combustion conditions are achieved at the same time as a considerable reduction in the overall height of the entire cyclone preheater.

7 Claims, 2 Drawing Sheets

APPARATUS AND METHOD FOR THE HEAT TREATMENT OF FINE-GRAINED MATERIAL

The invention relates to apparatus (according to the preamble to claim) and to a method (according to the generic concept of claim 6) for the heat treatment of fine-grained material.

Apparatus according to the preamble to claim 1 is known for example from DE-AS No. 22 48 030. In this disclosure the two branches of the branched tertiary air pipe extend approximately horizontally, and the material discharge pipe from the second-lowest stage of the cyclone preheater opens into one branch of the tertiary air pipe at a point which is at approximately the same height as that at which this branch of the tertiary air pipe is connected to the combustion chamber.

The object of the invention is to construct apparatus according to the preamble to claim 1 in such a way that the overall height of the cyclone preheater is significantly reduced and at the same time the combustion conditions in the combustion chamber are improved.

It is a further object of the invention to provide a method according to the preamble to claim 6 in such a way that the heat transfer at the start of combustion is kept within limits to the extent that a temperature higher than the calcination temperature (approximately 850° C.) is produced, thus making improved combustion possible, particularly of unreactive fuels.

These objects are achieved according to the invention by the characterising features of claims 1 and 6. Advantageous embodiments of the invention are the subject matter of the subordinate claims.

In the apparatus according to the invention the branched part of the tertiary air pipe extends upwards, and the material discharge pipe from the second-lowest stage of the cyclone preheater opens into one branch of the tertiary air pipe at a point which is lower than the point at which this branch of the tertiary air pipe is connected to the combustion chamber. Such a construction not only ensures good dispersal of the material which is delivered pneumatically to the combustion chamber and excellent combustion conditions, but also facilitates a very low arrangement of the second-lowest stage of the cyclone preheater and thus a considerable reduction in the overall height of the entire cyclone preheater.

Figure 1:
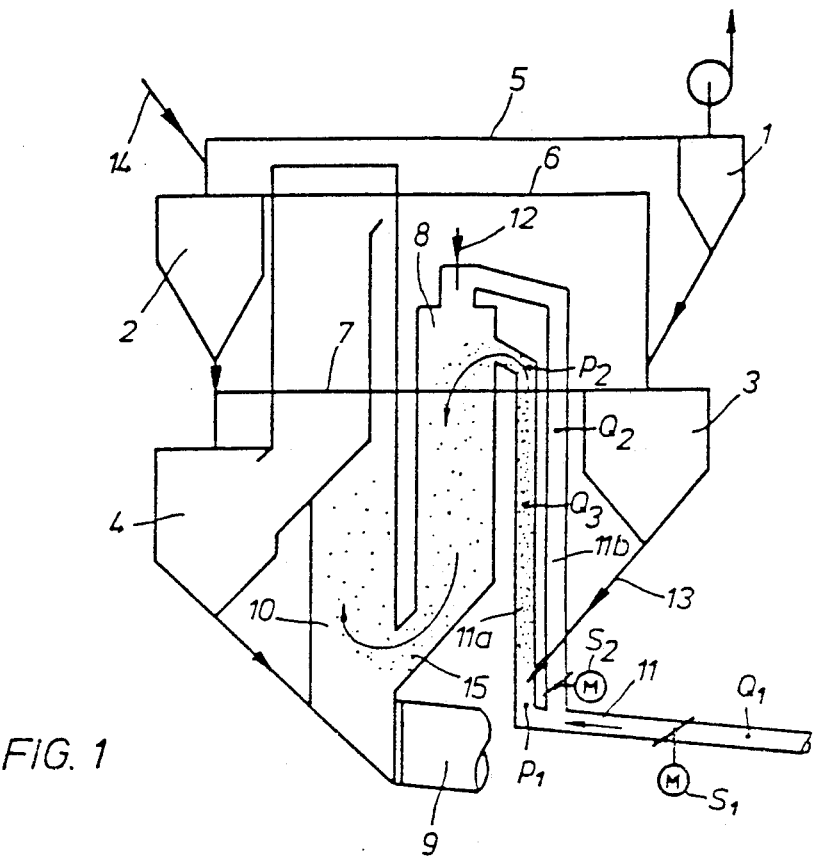
FIG. 1 shows a schematic representation of apparatus according to the invention.

The apparatus which is shown schematically in FIG. 1 and serves for the heat treatment of fine-grained material, such as cement raw material, contains a multistage cyclone preheater which consists of the cyclones 1, 2, 3, 4 and the gas pipes 5, 6, 7 which connect them and are only shown schematically.

The apparatus also contains a combustion chamber 8 which serves for precalcination of the preheated material, a rotary kiln 9 for final burning of the precalcined material and a cooler which is not shown for cooling the material which has undergone final burning.

The rotary kiln 9 is connected to the lowest stage (cyclone 4) of the preheater by means of a mixing and reaction reactor 10 which rises initially and then after bending is led back downwards to the cyclone 4. In this way an advantageous long length of pipe is achieved for the residual burn-out of the fuel added in the combustion chamber and for the utilisation of the heat content of the exhaust gases from the rotary kiln 9.

A tertiary air pipe 11 leading from the cooler (which is not shown) to the combustion chamber 8 branches at its combustion chamber end into two branch pipes 11a, 11b which are both connected to the combustion chamber 8. The branch pipe 11a opens at the upper end of the cylindrical combustion chamber 8 at a peripheral point, whilst the branch pipe 11b is introduced through the cover of the combustion chamber 8. A fuel supply 12 is also provided in the region of this connection point of the branch pipe 11b. The material discharge pipe 13 from the second-lowest stage (cyclone 3) of the cyclone preheater opens into the branch pipe 11a of the tertiary air pipe at a point which is substantially lower than the point at which this branch pipe 11a is connectd to the combustion chamber 8. The branched part of the tertiary air pipe 11, that is to say the branch pipes 11a and 11b, extends upwards (approximately vertically in the illustrated embodiment).

Because of this orientation of the tertiary air pipe 11 and the connection of the material discharge pipe 13 at a low-lying point on the tertiary air pipe, the cyclone 3 of the preheater (which in the past had to be arranged higher than the combustion chamber 8) can be arranged very low down. Since the vertical position of the following stages (cyclones 1, 2) of the preheater is consequently also lowered, this results in a greatly reduced overall height of the entire cyclone preheater.

The fine-grained material, for example cement raw material, is introduced into the gas pipe 5 at 14, separated in the cyclone 1, delivered via the gas pipe 6 to the cyclone 2, then passes through the gas pipe 7 to the cyclone 3 and is introduced through the material discharge pipe 13 into the branch pipe 11a of the tertiary air pipe 11 and in this pipe is conveyed pneumatically to the combustion chamber 8. The material preheated in the cyclone preheater is highly heated and precalcined. In order to achieve a good start of combustion and optimum burn-out of the fuel supplied via the fuel supply 12, meal-free combustion air is introduced into the upper region of the combustion chamber 8 via the branch pipe 11b. The distribution of the tertiary air to the branch pipes 11a and 11b can be set by means of valves $S_2$ and $S_2$.

At its lower end the combustion chamber 8 is connected to the reactor 10 by a chute-like connection 15. By means of this connection 15 the exhaust gases from the combustion chamber 8 and the precalcined material are introduced into the mixing and reaction reactor 10. As it flows through this reactor 10 the residual burn-out of the the fuel added in the combustion chamber 8 takes place, and the material undergoes further heat treatment and deacidification. After separation in the cyclone 4, the material which has been almost completely calcined passes to the rotary kiln 9 and then to the cooler (which is not shown).

The branch pipe 11a of the tertiary air pipe 11 to which the material discharge pipe 13 of the cyclone 3 is connected advantageously opens approximately tangentially into the combustion chamber 8.

The other branch pipe 11b of the tertiary air pipe 11 is not connected to the material discharge pipe 13 but opens into the combustion chamber 8 at a point (in the cover in the illustrated embodiment) which is nearer to the fuel supply 12 than the opening of the branch pipe which is connected to the material discharge pipe 13. In this way it is ensured that the fuel initially ignites in pure air before it comes into contact with the material.

Figure 2:
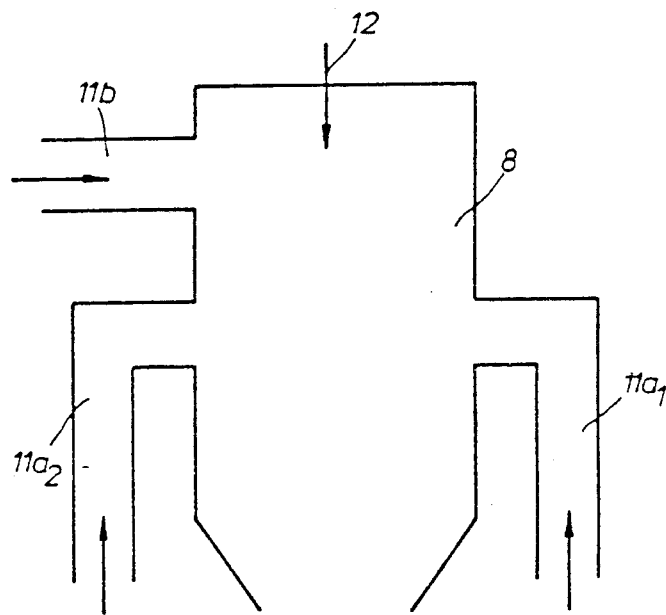
FIG. 2 shows a detail of a variant.

In the variant shown in FIG. 2 the branch pipe 11a of the tertiary air pipe which is connected to the material discharge pipe 13 branches into at least two further branch pipes $11a_1$, $11a_2$, which open into the combustion chamber 8 at different peripheral points, preferably tangentially. The connection of the branch pipe 11b, which conveys pure air, lies higher so that the fuel delivered via the fuel supply 12 ignites initially in pure air before it comes into contact with the material delivered pneumatically via the branch pipes $11a_1$, $11a_2$.

The calciner of the apparatus according to the invention has two stages. The first stage is formed by the combustion chamber 8 and the second stage by the mixing and reaction reactor 10. The combustion chamber 8 should facilitate the burn-out above all of poorly reactive fuels, since the temperature in the core of this combustion chamber is higher than the calcination temperature. With poorly reactive fuel the burn-out in the combustion chamber is typically 30 to 40% and the precalcination 40 to 50%. The rest of the burn-out and the almost complete deacidification of the material take place in the subsequent mixing and reaction reactor 10.

The total quantity of tertiary air $Q_1$ and the quantity $Q_2$ of the second branch stream of tertiary air which is delivered to the combustion chamber 8 as pure combustion air (without material charge) are determined by means of suitable volume metering equipment (e.g. a differential pressure measuring orifice) through a throttle point. The total quantity of tertiary air $Q_1$ is altered by means of the valve $S_1$ according to process engineering requirements.

The measured values for the quantities $Q_1$ and $Q_2$ are passed to a regulator which carries out a quotient formation. The result is automatically compared by the regulator with a theoretical value for the quotient which can be chosen by the operating personnel. In the event of a deviation between the actual value for the quotient determined from the measurements and the theoretical value for the quotient, the regulator automatically adjusts the quantity $Q_2$ of the second branch stream of tertiary air via the valve $S_2$ until the actual and theoretical values coincide. This regulation can be carried out by means of a conventional ratio controller.

By these means it is ensured that a part quantity $Q_2$ of the total quantity $Q_1$ which is constant in percentage terms is delivered to the combustion chamber 8 irrespective of the adjustment of the total quantity of tertiary air $Q_1$ carried out by means of the valve $S_1$ according to process engineering requirements.

In order to check whether the quantity $Q_3$ of the first branch stream of tertiary air used for the pneumatic transport of material is sufficient for the transport of the preheated material which is delivered, a differential pressure measurement ($\Delta p = p_2 - p_1$) is advantageously carried out in the first branch stream of tertiary air which is charged with material.

Figure 3:
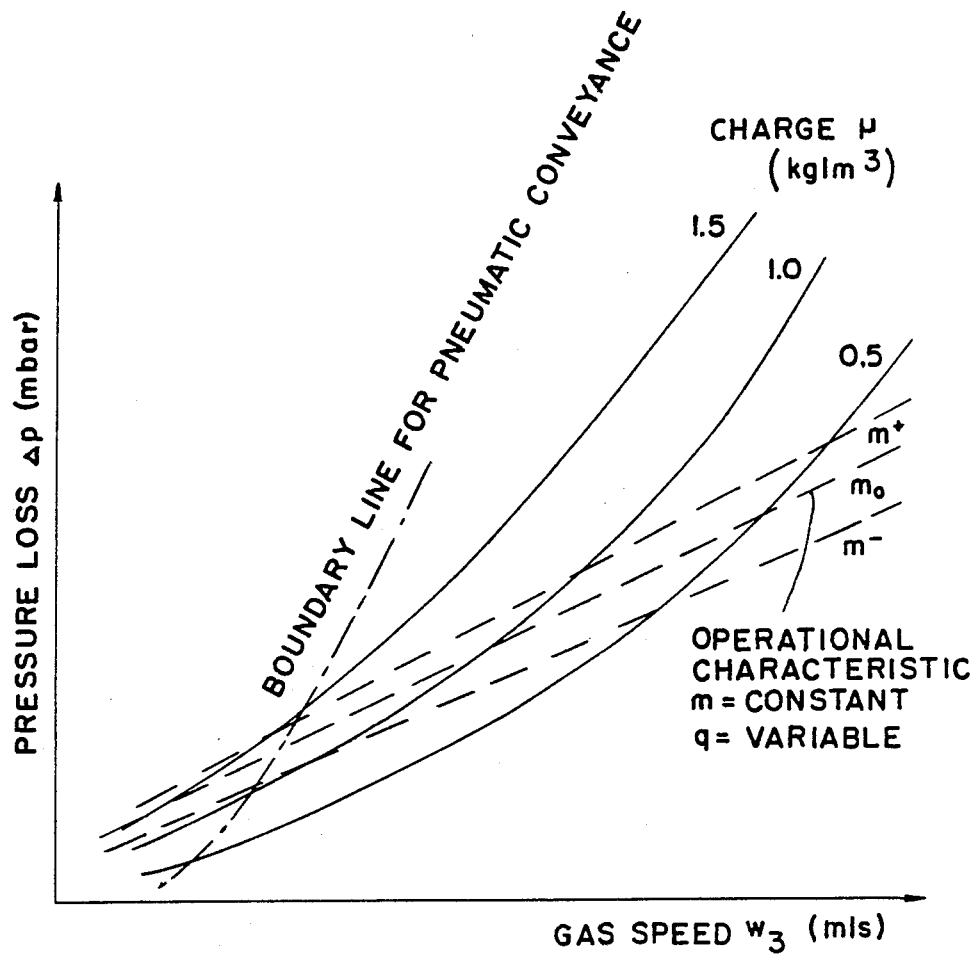
FIG. 3 shows a diagram.

FIG. 3 illustrates the essential relationships. The diagram shows the pressure loss $\Delta p$ in the branch pipe 11a as a function of the gas speed $w_3$ in this branch pipe 11a. The parameter is the charge $\mu$[kg material/m$^3$ air].

On the basis of the law of resistance there is a parabolic dependence for the differeing charge $\mu$.

The boundary line for pneumatic conveyance is shown by dash-dot lines. In the case of a higher charge a higher gas speed $w_3$ must be provided so that no material "falls through". Thus for each charge there is a specific boundary value for the pressure loss $\Delta p$ which it must not fall below.

If the apparatus is started (and here monitoring of the pneumatic conveying of material in the branch pipe 11a is particularly important), then first of all low values for the charge $\mu$ and the gas speed $w_3$ exist. At the operating point, on the other hand, the value for the charge $\mu$ is higher, which necessitates a correspondingly higher gas speed $w_3$ and a correspondingly higher minimum value for the pressure loss $\Delta p$. Therefore in each case the minimum value for the pressure loss $\Delta p$ which must be kept to should be chosen as a function of the respective charge $\mu$.

If the quantity of material conveyed m is assumed to be constant and if the quotient $q = Q_2/Q_1$ is variable (it is chosen by the operating personnel as a function of the process engineering requirements), then in the ideal case there will be a linear operational characteristic (shown by a broken line in FIG. 3). In the event of an alternation in the quantity of material conveyed, this operational characteristic moves upwards (increase in the quantity of material) or downwards (decrease in the quantity of material).

As a variant of the method described it is also possible for the quantity $Q_2$ of the second branch stream of tertiary air supplied as pure combustion air to be adjusted to the burner capacity of the combustion chamber 8. In this case the percentage-wise distribution between $Q_1$ and $Q_2$ is omitted.

Furthermore, the valve $S_1$ can also be adjusted to the burner capacity of the combustion chamber 8 or vice versa. In this case the percentage-wise distribution according to $Q_1$ and $Q_2$ is retained.

By determining $Q_1$ and $Q_2$, $Q_3$ is also known. The determination of the differential pressure $\Delta p$ thus facilitates the determination of the quantity of preheated material which is conveyed. A number of interesting operational values can be determined by this means, for example the material circulation inside the lower stages of the cyclone preheater and the calciner, the material charge in the calciner (i.e. in the combustion chamber 8 and in the reactor 10), the adaptation of the calciner burner capacity to the heat requirement of the material for a predetermined degree of deacidification (using the temperature as controlled variable), etc.

We claim:

1. Apparatus for the heat treatment of fine-grained material, such as cement raw material, having
    (a) a multi-stage cyclone preheater for preheating the material,
    (b) a combustion chamber for precalcination of the preheated material,
    (c) a mixing and reaction reactor for almost complete calcination of the precalcined material,
    (d) a rotary kiln connected to the cyclone preheater by the mixing and reaction reactor for final burning of the calcined material,
    (e) a cooler for cooling the finally burnt material,
    (f) a tertiary air pipe which leads from the cooler to the combustion chamber and branches into at least two branch pipes which are both connected to the combustion chamber,
    (g) a material discharge pipe connected to the second-lowest stage of the cyclone preheater, the material discharge via this pipe being delivered to the combustion chamber, (h) a connection between the combustion chamber and the mixing and reaction reactor and through which the exhaust gases from the combustion chamber and the precalcined material are introduced into the mixing and reaction reactor, characterised by the following features:

(i) the branched part of the tertiary air pipe extends upwards; and (k) the material discharge pipe from the second-lowest stage of the cyclone preheater opens into one branch pipe of the tertiary air pipe at a point which is lower than the point at which said one branch pipe of the tertiary air pipe is connected to the combustion chamber.

2. Apparatus as claimed in claim 1, characterised in that the combustion chamber is upright, said two branch pipes of the tertiary air pipe opening into the combustion chamber adjacent its upper end, and the connection leading to the mixing and reaction reactor being connected to the combustion chamber adjacent its lower end.

3. Apparatus as claimed in claim 1, characterised in that at least said one branch pipe of the tertiary air pipe to which the material discharge pipe of the second-lowest stage of the cyclone preheater is connected opens into said combustion chamber approximately tangentially thereof.

4. Apparatus as claimed in claim 1, characterised in that the other branch pipe of the tertiary air pipe which is not connected to the material discharge pipe opens into the combustion chamber at a point nearer the fuel supply than that at which said one branch pipe is connected to the material discharge pipe.

5. Apparatus as claimed in claim 1, characterised in that said one branch pipe of the tertiary air pipe which is connected to the material discharge pipe is branched into at least two further branch pipes which open into the combustion chamber at different points.

6. Method of heat treatment of fine-grained material, such as cement raw material, in which (a) the material is preheated in a multi-stage cyclone preheater, (b) the preheated material is precalcined in a combustion chamber, (c) and then is almost completely calcined in a mixing and reaction reactor, (d) the calcined material is finally burnt in a rotary kiln, (e) the finally burnt material is cooled in a cooler, (f) tertiary air is delivered in two branch streams from the cooler to the combustion chamber, (g) the exhaust gases from the combustion chamber and the material which has been precalcined in the combustion chamber are introduced into the mixing and reaction reactor which is arranged between the rotary kiln and the cyclone preheater, (h) the preheated material is introduced into the combustion chamber via the first branch stream of tertiary air, and (i) the second branch stream of tertiary air is delivered without any material charge to the combustion chamber as pure combustion air, characterised by the following further features:

(k) measuring the total quantity of tertiary air and the quantity of the second branch stream of tertiary air, deriving from these measured values on actual value quotient, comparing said actual value quotient with a theoretical value quotient, and (i) in the event of a deviation between the actual and theoretical quotient values, adjusting the quantity of the second branch stream of tertiary air to cause the acutal and theoretical values to coincide.

7. Method as claimed in claim 6, characterised by the following further feature:

(m) choosing a differential pressure for said first branch stream as a function of the charge of material in said first branch stream and measuring and monitoring said differential pressure to determine whether said differential pressure falls below a selected value.

* * * * *